United States Patent
Behrendt et al.

(10) Patent No.: US 8,801,998 B2
(45) Date of Patent: Aug. 12, 2014

(54) METHOD FOR PRODUCING A POLYAMIDE NANOFIBER PRODUCT BY ELECTROSPINNING

(75) Inventors: Nico Behrendt, Wolfsburg (DE); Anton Kreiner, Reisbach (DE); Maximilian Steinbrunner, Marklkofen (DE); Heiko Brosi, Oberstenfeld (DE); Bjoern Schmid, Stuttgart (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/570,784

(22) Filed: Aug. 9, 2012

(65) Prior Publication Data

US 2013/0206683 A1    Aug. 15, 2013

(30) Foreign Application Priority Data

Aug. 9, 2011   (DE) .......................... 10 2011 109 767

(51) Int. Cl.
| | | |
|---|---|---|
| *H05B 7/00* | (2006.01) | |
| *D01F 1/02* | (2006.01) | |
| *D01D 5/00* | (2006.01) | |
| *D01F 1/09* | (2006.01) | |
| *D01F 1/10* | (2006.01) | |
| *D01F 6/60* | (2006.01) | |

(52) U.S. Cl.
CPC ................ *D01D 5/0038* (2013.01); *D01F 1/02* (2013.01); *D01F 1/09* (2013.01); *D01F 1/10* (2013.01); *D01F 6/60* (2013.01)
USPC ............................ 264/465; 264/104; 264/211

(58) Field of Classification Search
CPC ...... B01D 71/56; B01D 71/36; B01D 69/127; B01D 69/14; B01D 69/141; B01D 69/142; B01D 2323/39; B01D 2323/0631; D01D 5/0038; D01F 1/02; D01F 1/09; D01F 1/10; D01F 6/60
See application file for complete search history.

(56) References Cited

U.S. PATENT DOCUMENTS

| | | |
|---|---|---|
| 4,044,404 A | 8/1977 | Martin et al. |
| 4,127,706 A | 11/1978 | Martin et al. |
| 4,323,525 A | 4/1982 | Bornat |

(Continued)

FOREIGN PATENT DOCUMENTS

| | | |
|---|---|---|
| DE | 102005063038 | 7/2007 |
| DE | 102006062113 | 6/2008 |
| EP | 1878482 | 1/2008 |
| WO | WO2008028428 | 3/2008 |

(Continued)

OTHER PUBLICATIONS

Xai Zhongfu—Paper: High Surface Charge stability of . . . .

(Continued)

*Primary Examiner* — Matthew O Savage
*Assistant Examiner* — Benjamin J Behrendt
(74) *Attorney, Agent, or Firm* — James Hasselbeck

(57) ABSTRACT

In a method for producing a polyamide nanofiber product that contains PTFE particles, a spinning solution containing polyamide, PTFE, and a conductivity-increasing additive is provided and nanofibers are produced by electrospinning from the spinning solution. The conductivity-increasing additive is an acid-resistant additive; a surfactant additive; or an acid-resistant and surfactant additive and contains one or more organic salts. The polyamide nanofiber product with PTFE particles is used in filter media and is especially applied to a filter layer of cellulose or synthetic material.

14 Claims, 6 Drawing Sheets

(56) References Cited

U.S. PATENT DOCUMENTS

| | | |
|---|---|---|
| 2005/0053840 A1* | 3/2005 | Jo et al. .................. 429/247 |
| 2007/0148365 A1 | 6/2007 | Knox et al. |
| 2009/0004086 A1 | 1/2009 | Kuhling et al. |
| 2010/0028553 A1 | 2/2010 | Maly et al. |
| 2010/0193999 A1 | 8/2010 | Anneaux et al. |
| 2011/0165811 A1* | 7/2011 | Hill et al. .................. 442/401 |
| 2012/0137885 A1* | 6/2012 | Dullaert et al. ............ 96/12 |
| 2012/0225358 A1* | 9/2012 | Seo et al. .................. 429/246 |

FOREIGN PATENT DOCUMENTS

| | | |
|---|---|---|
| WO | WO2008098526 | 8/2008 |
| WO | WO2009018463 | 2/2009 |
| WO | WO2009091406 A1 | 7/2009 |
| WO | WO2010124899 A1 | 11/2010 |

OTHER PUBLICATIONS

Huang Zheng-Ming—paper: A review of polymer nanofibers . . . .

* cited by examiner

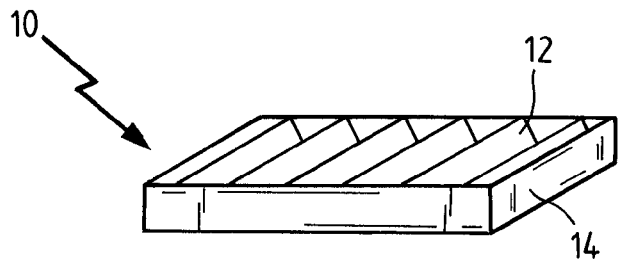
Fig.8
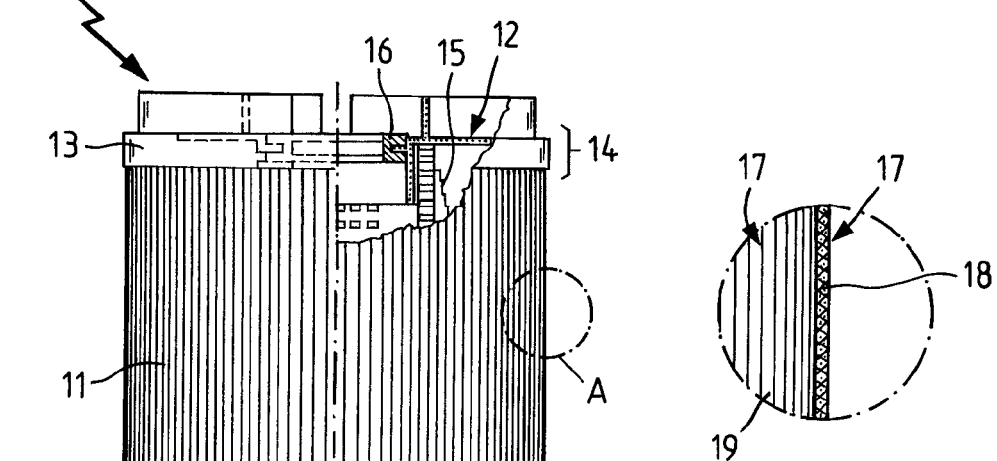
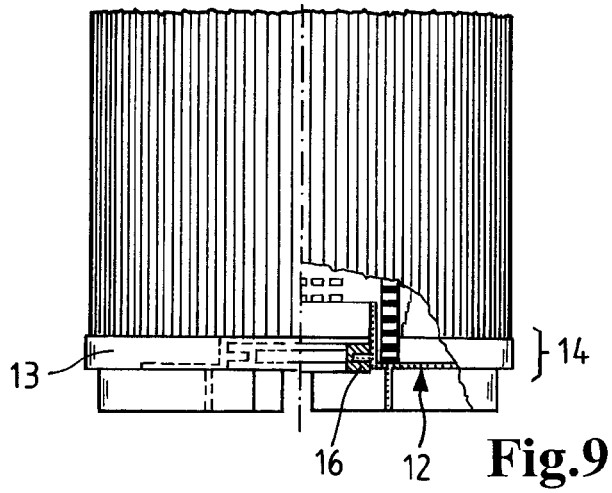
Fig.9a
Fig.9
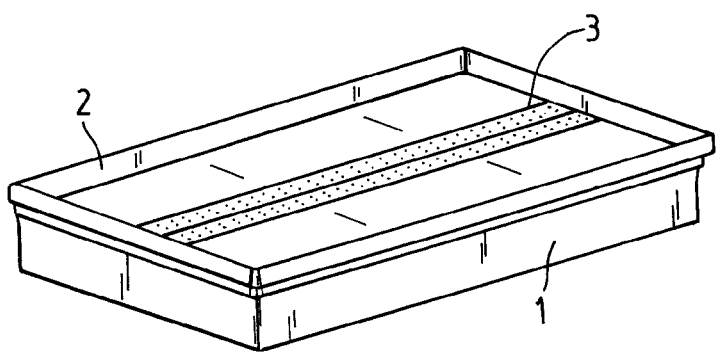
Fig.10

US 8,801,998 B2

METHOD FOR PRODUCING A POLYAMIDE NANOFIBER PRODUCT BY ELECTROSPINNING

CROSS REFERENCE TO RELATED APPLICATION

Priority is claimed based on German patent application no. 10 2011 109 767.1, filed Aug. 9, 2011, the entire contents of which are incorporated herein by reference.

TECHNICAL FIELD

This disclosure concerns a method for producing a polyamide nanofiber product by means of electrospinning, a polyamide nanofiber product, a filter medium with a polyamide nanofiber product, as well as a filter element with such a filter medium.

BACKGROUND OF THE INVENTION

Ultra-thin fibers (so-called nanofibers, i.e., fibers with a fiber diameter of predominantly (more than 99% of the total number of fibers) in the range of less than 500 nm) are nowadays produced, aside from known methods such as meltblowing or island-in-the-sea, primarily by the so-called electrospinning method. Electrospinning (also referred to as electrostatic spinning) is a multi-purpose method for producing, from solutions and a melt, primarily of polymers, continuous fibers with diameters of a few micrometers up to a few nanometers. The method is versatile because almost all soluble and meltable polymers can be employed; the polymers moreover can be furnished with various additives, from simple soot particles to complex species such as enzymes, viruses, and bacteria; and, of course, chemical modifications are also possible.

Actually, electrospinning is not a fiber spinning method but instead is a method for coating with microfiber and nanofiber nonwovens. By electrospinning, almost any solid and liquid substrates can be coated with a thin layer of polymer fiber nonwovens, typically having a weight per surface area of less than 1 g/m2. Such electrospun polymer fiber nonwovens are extremely delicate and actually can essentially be used only when applied to substrates. By a significant increase of the productivity of the electrospinning method, also self-supporting electrospun tissues are now accessible that have significantly higher weights per surface area (up to 200 g/m2) and therefore can no longer be considered a coating.

FIGS. 1a and 1b show schematically the configuration of an electrospinning experiment for fiber production. In today's electrospinning apparatus a polymer solution or melt 22 is sprayed from a thin steel wire 5 with a diameter of approximately 0.2 mm thickness. The wires are arranged on a cylinder and are immersed at regular intervals by a circular movement into the spinning solution so that they are coated with solution or melt. Since the spinning solution container 21 is at high voltage, this causes the solution to be sprayed off from the wires 5. The wire electrodes that are used in the context of the invention are disclosed, for example, in WO 2008/98526 and WO 2008/028428.

The applied voltage effects a conical deformation of the droplet in the direction of the counterelectrode. Along the path to the counterelectrode, the solvent contained in the spinning solution will evaporate (or the melt will solidify) and on the counterelectrode solid fibers with diameters of several micrometers down to a few nanometers are deposited at high speed.

As already mentioned, for the electrospinning method almost all soluble and meltable polymers can be used. Polytetrafluoroethylene (PTFE) is a high-temperature polymer that is characterized by an excellent resistance with respect to chemicals and environmental effects and moreover has a crystallite melting point of 327 degrees Celsius. However, it hardly dissolves in solvents because of its chemical resistance. Therefore, no classical spinning solution for the electrospinning process can be provided in order to produce fine fibers in a nanometer and/or sub-micrometer range. PTFE fibers produced on the basis of a melt electrospinning process are also not been available at this time. The reason is the relatively high melting range and the decomposition tendency of the melt with poisonous hydrogen fluoride being cleaved off. Moreover, PTFE has the tendency to creep. Generally, the aforementioned methods for processing PTFE are very complex and their usability for the manufacture of relatively simple pressed and sintered parts from powder and pastes is limited.

Still, PTFE with its excellent electret properties and its distinct hydrophobic properties is a very interesting material with respect to filtration purposes. Particularly negative charges, for example, caused by corona discharge, can be stored excellently on the PTFE surfaces. Discharge of PTFE by moisture occurs only very slowly because the material, as already mentioned, is highly hydrophobic.

Since PTFE practically cannot be spun to very thin fibers and fiber-like structures can be obtained only by stretching of PTFE films, already known technical solutions are based on fiber-like membranes. The latter can be produced with high technical expenditure from PTFE and subsequently can be provided optionally with additional fibers of other polymer materials. For example, EP 1 878 482 discloses a filter medium with a porous PTFE membrane, an air-permeable support element, and a web layer which is produced by electrospinning from polymer fibers.

Known in the prior art are also microporous PTFE membranes that are used in pieces of clothing.

Another strategy is to use other fluoropolymers and therefore to "imitate" the desired properties of PTFE. For example, WO 2009/018463 discloses various blends of different fluoropolymers that are spun from an acetone solution to a fine fiber layer and subsequently are crosslinked by high-energy electron beams. This method is however very complex and the fine fiber layer obtained thereby of fluoropolymers can be used subsequently only for the described application purpose of separation of water from liquid hydrocarbon mixtures (for example, diesel fuel).

U.S. 2010/0193999 discloses an improved method for producing a PTFE fiber mat by electrospinning of PTFE dispersions with a viscosity of at least 50,000 cP. In this connection, the electrostatically charged dispersion is collected on a target and forms thereat a pre-product from which, by heating, the solvent is removed and, in this way, the PTFE fiber mat is formed. The document contains no information as regards the diameter of the produced PTFE fibers. Further information with respect to processing and electrospinning of PTFE from an aqueous dispersion or other dispersions are provided in U.S. Pat. Nos. 4,323,525; 4,127,706; and 4,044,404. The fiber diameters of PTFE fibers disclosed therein are in the range of 0.1 to 25 micrometers.

SUMMARY OF THE INVENTION

It is therefore an object of the present invention to provide a method for producing a nanofiber product which is provided with PTFE particles, in particular a product which contains nanofibers with adhering PTFE particles, i.e., a product that has fibers with a fiber diameter predominantly (more than 99% of the total number of fibers) in the range of less than 500 nm, as well as with PTFE particles which in particular adhere to the nanofibers. A further object of the present invention resides in providing a filter medium that comprises such a nanofiber product, in particular for air filtration.

These and further objects are solved by the method according to the invention and the polyamide nanofiber product according to the invention.

According to the method, the nanofiber product is produced by electrospinning from spinning solutions containing polyamides, PTFE, and a conductivity-increasing additive.

The polyamide nanofiber product according to the invention is characterized in that it contains PTFE particles, in particular nanofibers with PTFE particles.

In a special embodiment of the method according to the invention, the additive that is used for increasing conductivity is an acid-resistant additive, in particular on the basis of one or several organic salts, preferably on the basis of quaternary ammonium compounds, further preferred on the basis of tetraalkyl ammonium ethyl sulfate, which is added especially dissolved in a solvent.

In an especially preferred embodiment of the invention, the additive has a surfactant action which leads to improved fiber formation. The reason for this is an advantageous enveloping of the PTFE particles by the surfactant additive.

In an advantageous further embodiment, to the spinning solution PTFE proportions in the range of 0.1% by weight to 10% by weight based on the basic batch, preferably 5% by weight to 7.5% by weight based on the basic batch, are added, and the proportion of the additive is 0.1% by weight to 10% by weight based on the basic batch. In particular, the additive proportion is 0.5% by weight to 10% by weight based on the basic batch. Basic batch is to be understood as the basic composition of the spinning solution itself, after addition of all components and additives, i.e., the composition that is used for the actual spinning process. It has been found that for the aforementioned compositions of the spinning solutions, on the one hand, a satisfactorily high conductivity of the spinning solution results but, on the other hand, the risk of precipitation of the polyamide, in particular as a result of adding too much of the additives, is accounted for sufficiently.

In a further advantageous embodiment of the invention, the addition of the conductivity-increasing additive is selected such that the conductivity is greater than 1,000 µS/cm. In practice, in particular a basic batch of the spinning solution has been found suitable which contains between 10% by weight to 20% by weight of polyamide and 70% by weight to 90% by weight of a mixture of formic acid and acetic acid, wherein preferably a quantity ratio of formic acid to acetic acid is 1:1.1 to 1:3.

In a preferred manner, the PTFE is added as a powder; compared to the addition of a dispersion, this has the advantage that the polyamide cannot be precipitated by water used as a dispersion agent. The addition in the form of a dispersion has the advantage that improved metering is ensured.

The PTFE powder is characterized by preferably having a mean particle diameter in a range of 0.2 micrometers; a density of 2,200 kg/m3; and/or a melting temperature of 320 degrees Celsius.

According to the invention, polyamide nanofibers are provided that contain PTFE particles, wherein the nanofibers or the nanofiber product in a preferred embodiment has a mean fiber diameter (arithmetic mean) between 10 nm to 500 nm, preferably 80 to 220 nm. With regard to the determination of the mean fiber diameter, reference is being had the method described in DE 10 2009 043 273 A1.

In accordance with the invention, a filter medium is also provided that contains the nanofiber product according to the invention wherein the filter medium in an especially preferred embodiment has a further filter layer that is coated with the nanofibers according to the invention or the nanofiber product according to the invention, wherein the filter layer is in particular based on cellulose or a synthetic medium. The synthetic medium is preferably made of PP (polypropylene), PET (polyethylene terephthalate), or PBT (polybutylene terephthalate). The synthetic medium is selected from meltblown material and spun nonwoven material.

The filter element according to the invention can be employed in particular for liquid filtration, passenger compartment air filtration in motor vehicles, and/or intake air filtration in motors.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 8 shows a second application of the fibers according to the invention;

FIG. 9 shows a third application of the fibers according to the invention; and

FIG. 10 shows a fourth application of the fibers according to the invention.

DETAILED DESCRIPTION

Figure 1A:
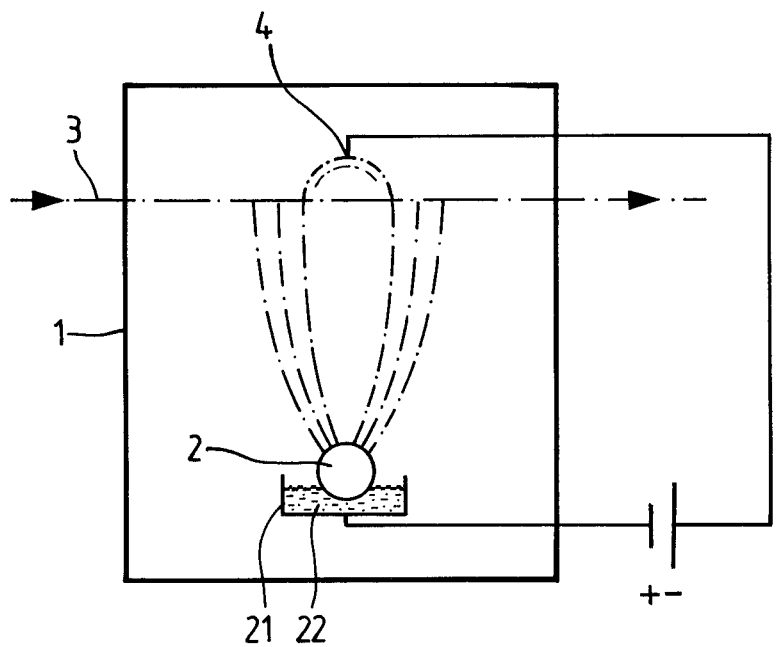
FIGS. 1a and 1b show schematically the configuration of an electrospinning experiment for fiber production.
Figure 1B:
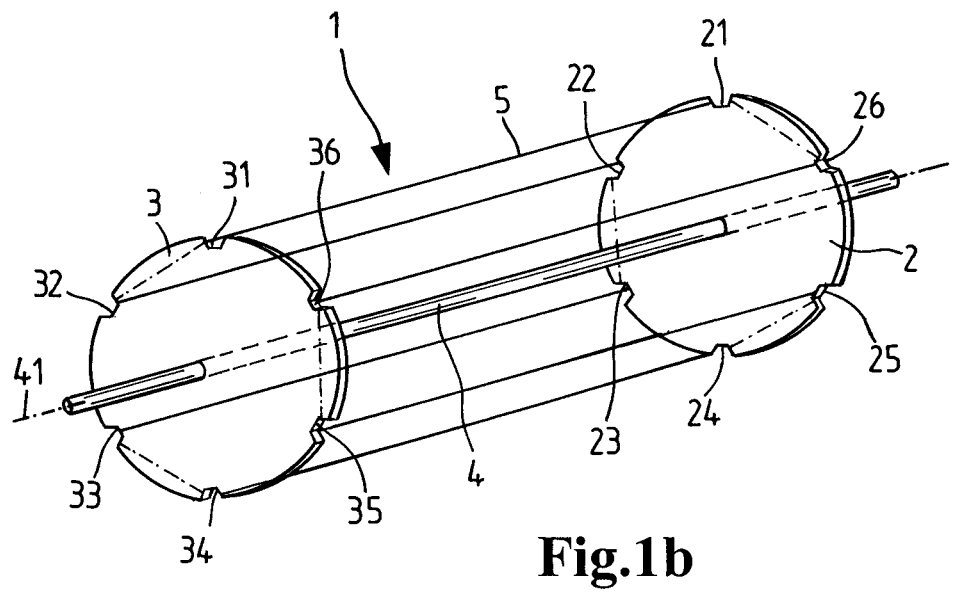

In the classic production of PTFE by emulsion polymerization, PTFE is obtained in the form of a dispersion from which easily PTFE powder with almost any particle diameter can be obtained. According to the invention, such PTFE particles are used in order to produce polyamide nanofibers that are provided with adhering PTFE particles. PTFE is practically insoluble in all solvents but PTFE particles can still be dispersed easily in different solvents. These dispersions are relatively stable and can be stored.

For performing the invention, the spinning solutions have added thereto PTFE particles, in particular as PTFE powder or as a dispersion (surfactant-stable aqueous solution) in the range of 0.1 to 7.5% by weight, preferably in the range of 5.0 to 7.5% by weight. When spinning the solutions under conventional conditions (see embodiments), it has however been found that the formation of nanofibers during the spinning process is greatly reduced or even entirely suppressed. The reason for this is apparently the reduction of conductivity of the spinning solution by adding PTFE particles. The cause is assumed to be that the PTFE particles are electrically insulating particles that, when added to the spinning solution, interrupt hydrogen bonds so that the conductivity of the solution is greatly decreased and, as a result of the lack of charge carrier concentration, no electrospinning of nanofibers can take place.

According to the invention, conductivity-increasing additives are therefore added to the spinning solutions. Generally, the conductivity-increasing additives can be salts that are comprised of the following anions: halogenides, carboxylates, phosphonates, thiocyanates, isothiocyanates, dicyanamides, (alkyl) sulfates, (alkyl) sulfonates, tetrafluoroborate, hexafluoro phosphonate or bis(trifluoromethyl sulfonyl) imide in combination with different substituted ammonium and/or phosphonium cations. It has been found that sulfates on the basis of tetraalkyl ammonium compounds are particularly effective, for example, tetraalkyl ammonium sulfate. As an example of such additives Deuteron® LE 151, tetraalkyl ammonium ethyl sulfate, dissolved in a suitable solvent, as well as Deuteron® LE 100 LV, an quaternary ammonium compound, both obtainable from Deuteron GmbH, Achim, Germany, should be mentioned. The addition of these conductivity-increasing additives caused the conductivity of the spinning solution with PTFE particles contained therein to increase by a factor of 10-15 (compare examples) in order to produce from them polyamide nanofiber coated with PTFE particles. Advantageously, nanofiber layers on the basis of polyamide (for example, BASF Ultramid B24) were produced with PTFE particles regularly distributed in the layers.

In the following, embodiments of the method according to the invention will be set forth.

As a polymer, polyamide (e.g., BASF Ultramid B24, but also other polyamides can be used) was employed. Separate spinning solutions are produced from the polymer. The basic batch of the spinning solution had the following composition:

Polyamide Batch:
16.75 g of polyamide (BASF Ultramid B24)
34.95 g of formic acid (99%)
48.3 g of acetic acid (96%)
Formic acid and acetic acid serve as a solvent for the polyamide.
Further components used are characterized as follows:
PTFE particles:
PTFE powder PRO470 PP of the company Proline Conductivity additives:
Deuteron® LE151
Deuteron® LE 100 LV
Substrate for coating with nanofibers:
cellulose paper with fire-resistant coating
width: 50 cm
weight per surface area: 130 g/m2
thickness: 0.44 mm
pressure drop: 70 Pa at 7.5 cm/s incoming flow speed
air permeability: 215 l/m2 at 200 Pa.

Appropriate quantities of PTFE particles and conductivity-increasing additives were added to the batches and thoroughly mixed in. The additive was added in a range of 0.1% to 10%, preferably in a range of 0.5% to 1.5%, of the basic batch.

Electrospinning:

For the spinning experiments a laboratory spinning device with rotating electrode of the company Elmarco (NS Lab 500) according to WO 2008/028428 was used. The spacing between wire electrode and counterelectrode was 170 mm. The rotary speed of the electrode was 6.1 rpm (38 Hz). Voltage and current at which the first spinning action was observed were recorded; usually, the solutions were spun at 80 kV. The paper substrate was coated at a speed of 1.56 m per minute. Depending on the solution, on the added additive, and on the substrate, currents of different strength occurred during spinning and were also recorded. All experiments were performed at room temperature (25 degrees Celsius).

COMPARATIVE EXAMPLE

Figure 2:
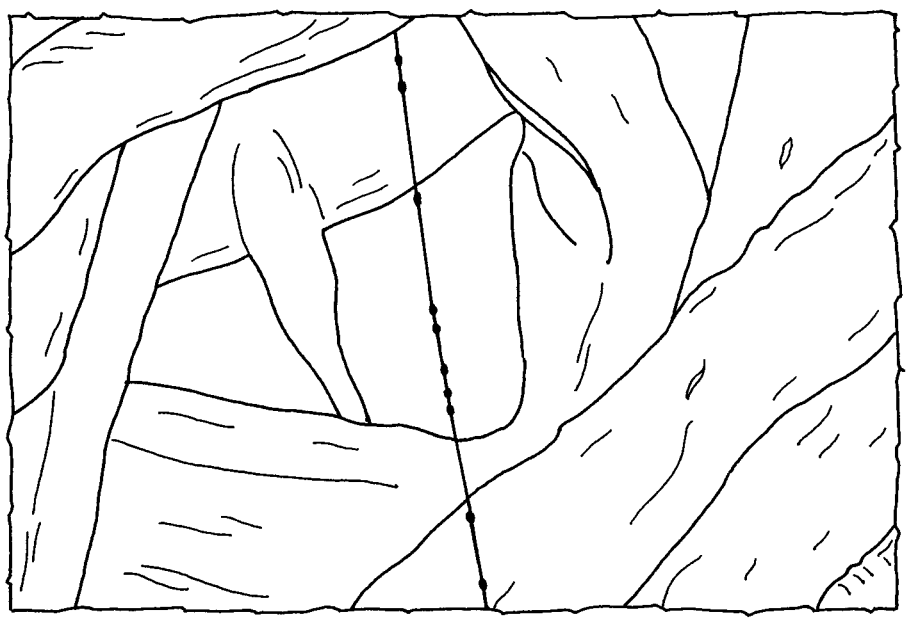
FIG. 2 shows a scanning electron microscope image of a first paper substrate that has been coated with fibers without use of an additive according to the invention.
Figure 3:
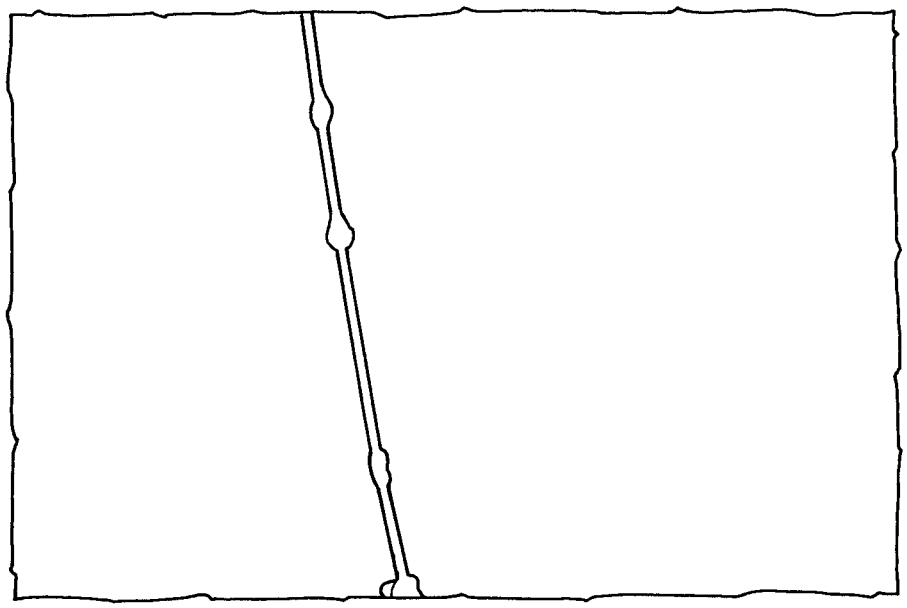
FIG. 3 shows a detail of the scanning electron microscope image of the paper substrate that has been coated with fibers without use of an additive according to the invention.

Polyamide and PTFE Particles without Addition of Conductivity-Increasing Additive The standard polyamide batch (total weight 100 g) was used (compare supra) and 5 g of PTFE powder were dispersed therein. The dispersion was subsequently thoroughly stirred for 2 hours. The measured conductivity (device name: Hanna HI 9835) of the dispersion was 104 µS/cm. During electrospinning, only upon application of a voltage of 80 kV, an extremely minimal tendency for forming nanofibers was observed; a current was not measurable. A subsequent scanning electron microscope examination (Oxford Instruments) of the fiber-coated paper substrate showed that only very isolated nanofibers were deposited on the substrate (FIG. 2). The few spherical structures along the individual fibers (FIG. 3) were however PTFE particles; this was determined by means of EDX (energy dispersive X-ray) analysis (fluorine; device name EVO 40).

Example 1

Figure 4:
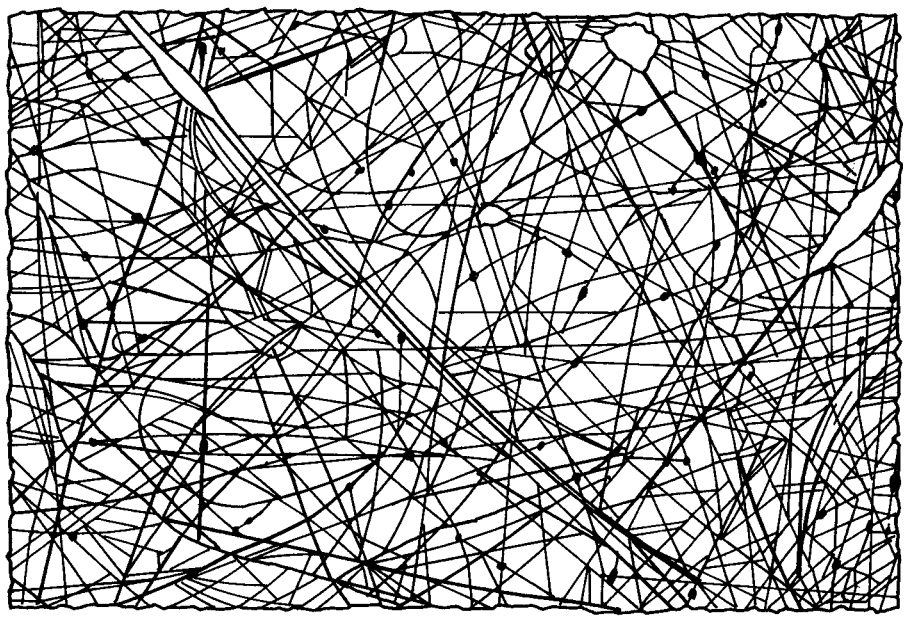
FIG. 4 shows a scanning electron microscope image of a paper substrate that is coated with fibers by using the additive according to the invention according to a first example.

Polyamide With 5% PTFE Particle Addition and Deuteron® LE 151 as a Conductivity-Increasing Additive The standard polyamide batch (total weight 100 g) was used and 5 g of PTFE powder dispersed therein and 0.6 g of Deuteron® LE 151 dissolved therein. The thus produced dispersion was stirred for 2 hours thoroughly. The measured conductivity of the dispersion was 1,624 µS/cm. A first formation of nanofibers was observed at an applied voltage of 60 kV; a current was not measurable. The paper substrate was coated continuously at a speed of 1.56 m per minute at an applied voltage of 80 kV. The current measured at this voltage was 0.021 mA. A subsequent scanning electron microscope examination (Oxford Instruments) of the fiber-coated paper substrate showed that a large number of nanofibers has formed on the substrate (FIG. 4). The spherical structures or thick portions along the individual fibers were PTFE particles; this was determined by means of EDX (energy dispersive X-ray) analysis (fluorine; EVO 40).

Example 2

Figure 5:
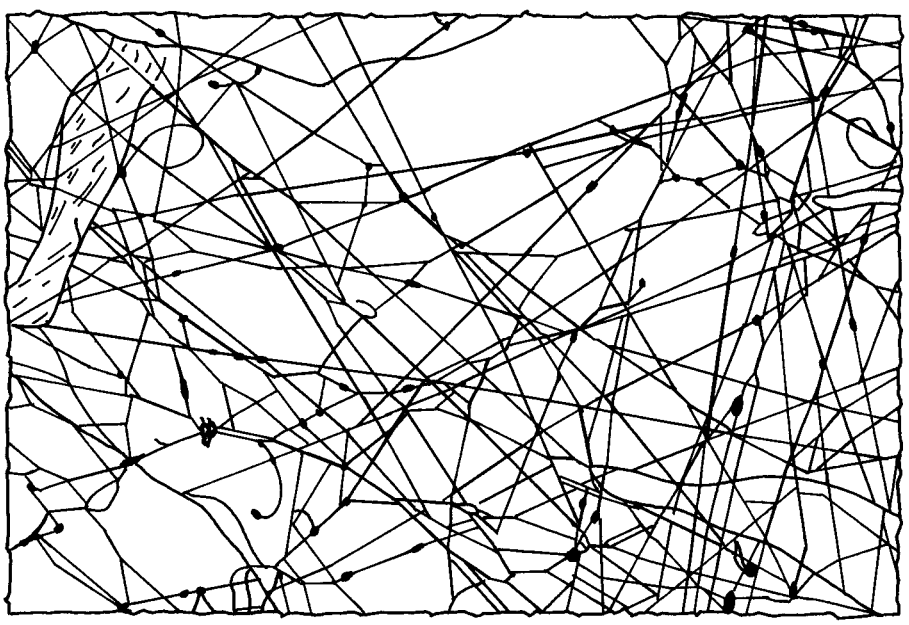
FIG. 5 shows a scanning electron microscope image of a paper substrate that is coated with fibers by using the additive according to the invention according to a second example.
Figure 6:
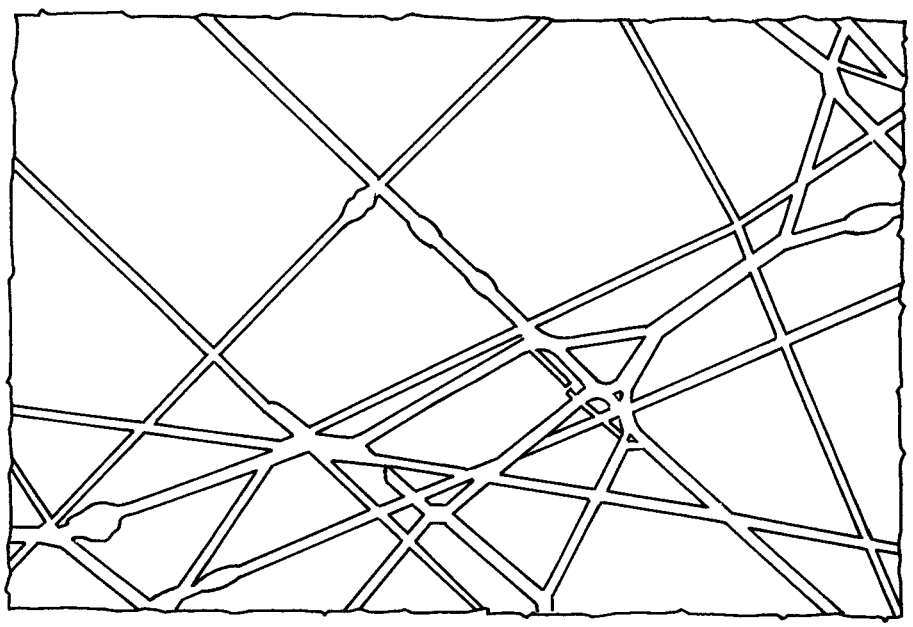
FIG. 6 shows a detail of the scanning electron microscope image of FIG. 5.

Polyamide with 7.5% PTFE Particle Addition and Deuteron® LE 151 as a Conductivity-Increasing Additive The standard polyamide batch (total weight 100 g) was used and 7.5 g PTFE powder dispersed therein and 0.9 g Deuteron® LE 151 dissolved therein. The produced dispersion was stirred for 2 hours thoroughly. The measured conductivity of the dispersion was 2,100 µS/cm. A first formation of nanofibers was observed at an applied voltage of 60 kV and a current of 0.002 mA was measured. The paper substrate was continuously coated at a speed of 1.56 m per minute and an applied voltage of 80 kV; the measured current was 0.026 mA. A subsequent scanning electron microscope examination (Oxford Instruments) of the fiber-coated paper substrate showed that a large number of nanofibers were formed on the substrate (FIG. 5). The spherical structures or thickened portions along the individual fibers (FIG. 6) were PTFE particles, as determined by means of EDX (energy dispersive X-ray) analysis (fluorine; EVO 40).

Example 3

Polyamide with 5% PTFE Particle Addition and Deuteron® LE 100 LV as a Conductivity-Increasing Additive The standard polyamide batch (total weight 100 g) was used and 5 g of PTFE powder dispersed therein and 0.6 g Deuteron® LE 100 LV dissolved therein. The produced dispersion was thoroughly stirred for 2 hours. The measured conductivity of the dispersion was 1,378 µS/cm. A first formation of nanofibers was observed at an applied voltage of 70 kV; a current was not measurable. The paper substrate was continuously coated at a speed of 1.56 m per minute with a voltage of 80 kV being applied; the measured current was 0.018 mA. The subsequent scanning electron microscope examinations (Oxford Instruments) of the fiber-coated paper substrate resulted in similar morphologies as in Example 1. In the nanofiber matrix a large proportion of PTFE particles was also observed; identification took place by means of EDX (energy dispersive X-ray) analysis (fluorine; EVO 40).

Example 4

Polyamide with 7.5% PTFE Particle Additive and Deuteron® LE 100 LV as a Conductivity-Increasing Additive The standard polyamide batch (total weight 100 g) was used and 7.5 g of PTFE powder dispersed therein and 0.9 g of Deuteron® LE 100 LV dissolved therein. The produced dispersion was thoroughly stirred for 2 hours. The measured conductivity of the dispersion was 1,878 µS/cm. A first formation of nanofibers was observed at a supply voltage of 60 kV; a current was not measurable. The paper substrate was continuously coated at a speed of 1.56 m per minute with a voltage of 80 kV being applied; the measured current was 0.022 mA. The subsequent scanning electron microscope examinations (Oxford Instruments) of the fiber-coated paper substrate showed similar morphologies as in Example 2. In the nanofiber matrix there were also large proportions of PTFE particles that were identified by means of EDX measurements (EVO 40).

Based on the experiments, it was possible to demonstrate that the addition of conductivity-increasing additives enables spinning of polyamide solutions to nanofibers with added PTFE particles; without these additives this is not possible. The reason for this is that the addition of PTFE particles to the spinning solution causes a decrease of conductivity. A significantly higher conductivity, for example, in the range of above 1,000 µS/cm is however required in order to enable the formation of so-called fiber jets. Therefore, additives were used that, in the meaning of the invention, are conductivity-increasing in order to compensate the effect of the PTFE particles.

Figure 7:
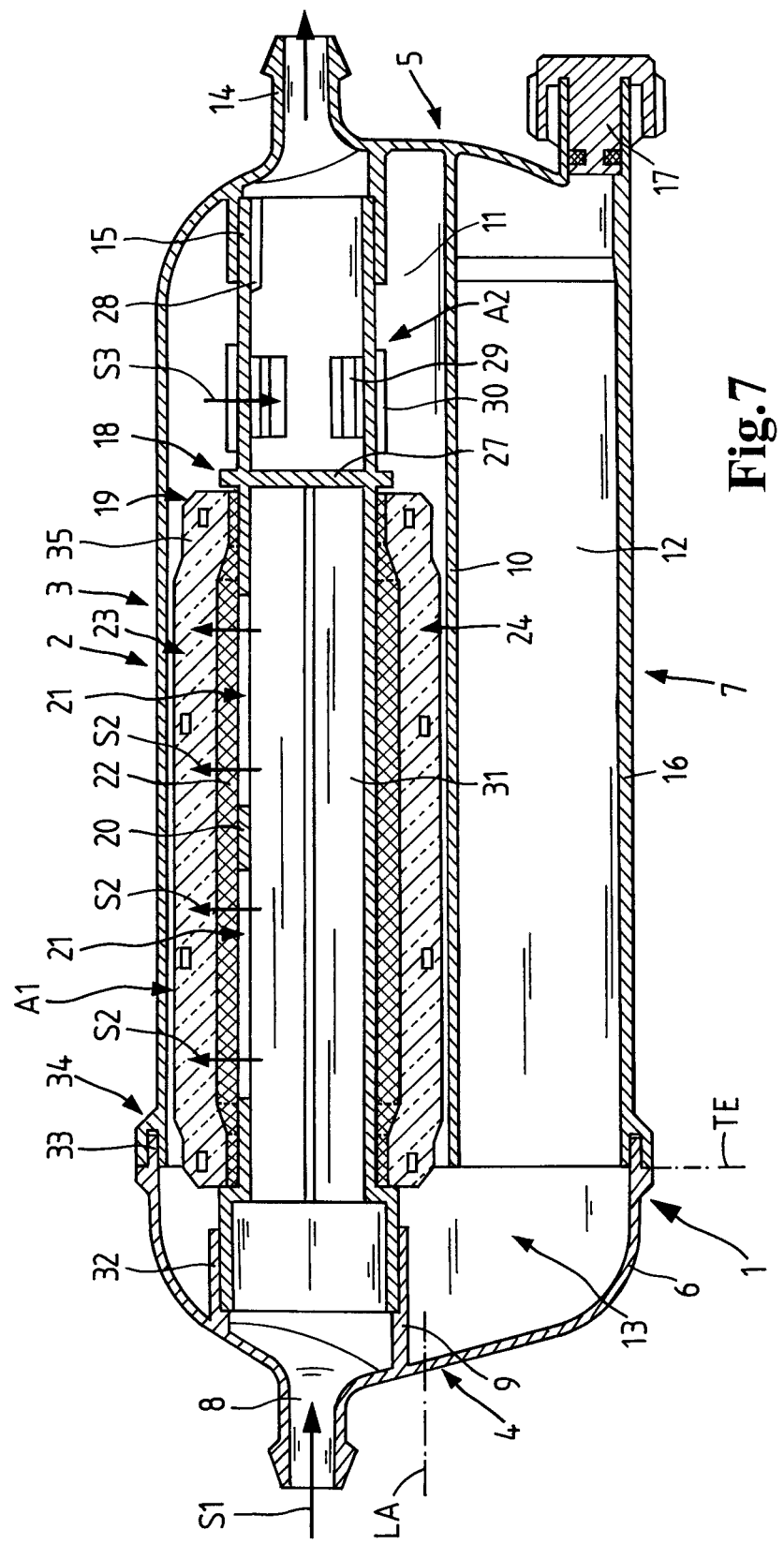
FIG. 7 shows a first application of the fibers according to the invention.

The nanofibers according to the invention with PTFE particles have a mean fiber diameter between 10 nm to 400 nm, in particular between 80 nm to 220 nm (measured according to the method disclosed in DE 10 2009 043 273 A1). The PTFE particles on the nanofibers have a mean (arithmetic mean) particle diameter in the range of 0.2 µm to 6 µm. The nanofibers, applied to an appropriate carrier (flame-resistant and phenolic resin-cured cellulose medium or synthetic medium) can also be used as a coalescence/water separation medium because alternating presence of hydrophilic (polyamide nanofibers) and hydrophobic areas (PTFE particles) causes a coalescing action, i.e., a separation of the water from fuels in the form of water droplets. FIG. 7 (compare also EP 2 226 107) shows a water separator 1 with a housing 2 with a separator chamber 11 formed therein, a separating element 18 arranged therein, and a collecting space 12 arranged underneath for the water that has been separated from the fuel. Moreover, an inlet 8 and an outlet 14 for the fuel are provided. The separating element 18 comprises two separating stages A1, A2 of which the first separating stage A1 contains a filter medium 22 which is comprised of a cellulose carrier with PTFE particle-containing nanofibers. The filter medium 22 is surrounded by an element 35 with a plurality of through openings which form a contour at the outlet side and, at the outlet side of the filter medium 22 and of the element 35 generates droplets of the water separated from the fuel. A person of skill in the art will know that other embodiments are possible also.

A further application of the nanofibers according to the invention resides in filtration of passenger compartment air in motor vehicles. The nanofibers according to the invention or the nanofiber product with PTFE particles according to the invention can be used for coating polypropylene nonwoven. The nanofiber-coated polypropylene nonwovens can subsequently be pleated and filters 10 for the passenger compartment in the automotive field (see FIG. 8) can be produced. The Figure shows the nonwoven with the PTFE-containing polyamide nanofiber product 12 with appropriate lateral strips 14. The preferred geometric data are listed in Table 1. A person of skill in the art will know that other embodiments are possible also, for example, round filter elements are possible.

TABLE 1

| | |
|---|---|
| filter geometry (length × width × height) | 230 × 238 × 30 |
| inflow surface area (m$^2$) | 0.05474 |
| medium surface area (m$^2$) | 0.613088 |
| fold height (mm) | 28 |
| fold spacing (mm) | 5 |
| number of folds | 46 |

A further application of the nanofiber product according to the invention for a filter element for filtration of liquids is shown in FIG. 9. The filter element has a filter medium 11 and the terminal disks 13 wherein the filter medium 11 is in particular of a cylindrical configuration and the terminal disks 13 are arranged on end faces 12 of the filter medium 11. In this connection, the filter medium 11 has at least two different filter layers 17 wherein one of these filter layers 17 is formed by the polyamide nanofiber product with PTFE particles 18. The liquids to be filtered can be, for example, cooling medium liquids.

Finally, FIG. 10 shows an application of the nanofiber product according to the invention in intake air filtration of a motor in motor vehicles. After application of a bonding agent, the polyamide nanofiber product with PTFE particles can be applied onto an appropriate carrier (flame-resistant and phenolic resin-cured cellulose medium). The thus produced filter medium with PTFE particle-containing nanofiber product 1 is subsequently folded, provided with a support bead of adhesive 3, and subsequently provided with a sealing lip of polyurethane 2. In addition to these flat filter elements, a person of skill in the art will know that other embodiments are possible also, for example, round filter elements. They comprise also a filter medium, comprised of cellulose with polyamide nanofibers and PTFE particles (1), and seals at the top and bottom sides 2, 3.

While specific embodiments of the invention have been shown and described in detail to illustrate the inventive principles, it will be understood that the invention may be embodied otherwise without departing from such principles.

The invention claimed is:

1. A method for producing a polyamide nanofiber product that contains PTFE (polytetrafluoroethylene) particles, the method comprising:
   providing a spinning solution containing polyamide, PTFE particles, and a conductivity-increasing additive;
   electrospinning nanofibers from the spinning solution;
   wherein the conductivity-increasing additive comprises one or more organic salts;
   wherein the one or more organic salts includes a quaternary ammonium compound;
   wherein the quaternary ammonium compound is tetraethyl ammonium ethyl sulfate.

2. A method for producing a polyamide nanofiber product that contains PTFE (polytetrafluoroethylene) particles, the method comprising:
   providing a spinning solution containing polyamide, PTFE particles, and a conductivity-increasing additive;
   electrospinning nanofibers from the spinning solution;
   wherein the spinning solution contains PTFE particles in a range of 0.1% by weight to 10% by weight based on a basic batch weight of the spinning solution.

3. The method according to claim 2, wherein
   the conductivity-increasing additive is an acid-resistant additive; a surfactant additive; or an acid-resistant and surfactant additive.

4. The method according to claim 2, wherein
   the spinning solution contains PTFE particles in a range of 5% by weight to 7.5% by weight based on a basic batch weight of the spinning solution.

5. The method according to claim 2, wherein
   a basic batch of the spinning solution contains between 10% by weight to 20% by weight of polyamide and 70% by weight to 90% by weight of a mixture of formic acid and acetic acid.

6. The method according to claim 5, wherein
   formic acid and acetic acid are present in a quantitative ratio of 1:1.1 to 1:3 by weight.

7. The method according to claim 2, wherein
   PTFE particles are is added as a powder or a dispersion.

8. The method according to claim 7, wherein
   the dispersion is an aqueous dispersion.

9. The method according to claim 7, wherein
   the PTFE powder has a mean particle diameter in a range of 0.2 micrometers.

10. The method according to claim 7, wherein
    the PTFE powder has a density of 2,200 kg/m$^3$.

11. The method according to claim 7, wherein
    the PTFE powder has a melting temperature of 320 degrees Celsius.

12. A method for producing a polyamide nanofiber product that contains PTFE (polytetrafluoroethylene) particles, the method comprising:
    providing a spinning solution containing polyamide, PTFE particles, and a conductivity-increasing additive;
    electrospinning nanofibers from the spinning solution;
    wherein the spinning solution contains the conductivity-increasing additive in a range of 0.1% by weight to 10% by weight of a basic batch weight of the spinning solution.

13. The method according to claim 12, wherein
    the spinning solution contains the conductivity-increasing additive in a range of 0.5% by weight to 1.00% by weight of a basic batch weight of the spinning solution.

14. A method for producing a polyamide nanofiber product that contains PTFE (polytetrafluoroethylene) particles, the method comprising:
    providing a spinning solution containing polyamide, PTFE particles, and a conductivity-increasing additive;
    electrospinning nanofibers from the spinning solution;
    wherein the conductivity-increasing additive is added in a quantity causing the conductivity of the spinning solution to be greater than 1,000 µS/cm.

* * * * *